United States Patent [19]
Mathur

[11] 3,783,313
[45] Jan. 1, 1974

[54] ELECTRICAL STEPPING MOTORS HAVING LOW INERTIA ROTORS

[75] Inventor: Radhey Mohan Mathur, Winnipeg, Manitoba, Canada

[73] Assignee: Canadian Patents and Development Limited, Ottawa, Ontario, Canada

[22] Filed: June 29, 1972

[21] Appl. No.: 267,587

[52] U.S. Cl.................... 310/49, 310/114, 310/67
[51] Int. Cl. ........................................ H02k 37/00
[58] Field of Search.................. 310/67, 49, 112, 310/114, 162, 163, 164, 181, 190, 194, 218, 269, 154

[56] References Cited
UNITED STATES PATENTS

| | | | |
|---|---|---|---|
| 3,372,291 | 3/1968 | Lytle | 310/49 |
| 3,500,081 | 3/1970 | Drejza | 310/49 |
| 3,571,638 | 3/1971 | Inariba | 310/164 |
| 3,684,907 | 8/1972 | Hinachi | 310/164 |
| 3,693,034 | 9/1972 | Inariba | 310/164 |
| 3,466,476 | 9/1969 | Snowdon | 310/67 |
| 3,508,091 | 4/1970 | Kavanaugh | 310/49 |
| 2,840,729 | 6/1958 | Kreuthmeir | 310/67 UX |

*Primary Examiner*—R. Skudy
*Attorney*—Roman J. Filipkowski

[57] ABSTRACT

The stepping rate of a multi-phase electrical stepping motor is increased by pairing stator sections with a rotor disc carrying two sets of axially extending rotor poles. Embodiments having four sections and a rotor of two discs, carrying segmental strip rotor poles, has stator poles of segmental opposed form aligned across an annular ring slot opening in the outer torus wall. Another embodiment has an annular pole slot in the torus side and angularly staggered salient poles, cooperating with a ring rotor of crenulate form with arcuate segmental pole faces joined by oblique bridge portions. All sections may be active sections, or an end section may have permanent magnet excitation of stator poles which number is the count of all active poles, and the rotor pole set associated has a like number of poles, to lock the rotor in each step position; a winding energized by low DC current is poled to cancel holding flux, a magnetic shunt being provided to avoid magnet demagnetization.

8 Claims, 16 Drawing Figures

ELECTRICAL STEPPING MOTORS HAVING LOW INERTIA ROTORS

This invention relates to electrical stepping motors of the form in which a plurality of toroidal stator sections are coaxially disposed along a rotor axis, and more particularly concerns stepping motors having at least two pairs of stator sections associated with rotor elements each carrying two sets of rotor poles, providing improved ratio of torque to angular moment of inertia, improved ratio of torque to weight, and improved reluctance ratio.

An objective in the quest for improvement of high speed electrical stepping motors is the maximization of peak torque developed at the rotor shaft when a stator coil is energized by a predetermined current pulse, while the minimization of angular moment of inertia of the rotor structure as a whole is an equally desirable objective. These objectives pose the conflicting problems, that whereas the torque may be increased linearly with radial increase of the rotor pole distance from the axis of rotation, the moment of inertia of the rotating body increases disproportionately with radius, as a powerethereof. The electromagnetic torque, which is the attractive force developed between rotor pole elements cooperating with the excited pole group of a stator section depends on the ratio of the maximum to the minimum inductances of the stator windings for the rotor positions at which the reluctances of the flux path between stator poles are respectively minimum and maximum. While such design provisions as minimal air gaps between stator and rotor poles can achieve low minima of reluctance values, it has heretofore not been possible to achieve large maximum reluctance values, i.e., values close to the stator pole gap reluctance with rotor poles absent. Consequently, in order to achieve a stepping motor design providing minimal mechanical inertia and electrical time constants, whereby the motor may function usefully under load at higher pulse rates and with increased resolution, a host of intricately related dimensional, magnetic and electrical parameters must be correctly chosen.

The majority of existing stepper motors dispose a relatively large portion of the total rotor mass in structure not actively participating in the magnetic circuit of the stator poles, and hence not contributing to development of torque. One approach to multi-phase stepping motor designs for high pulse rates has sought to minimise rotor pole radius, as by disposing a rotor disc having peripherally mounted iron pole bodies between axially opposed stator poles of toroidal radially slotted stator sections. A range of related high speed and high power stepping motors of this type in the prior art is discussed in the paper "*The Use of Stepping Motors in Numerically Controlled Machine Tools,*" Int. J. Mach. Tool Des. Res. Vol. 10, pp 417–437 published by Pergamon Press, 1970 by R. Bell, A. C. Loweth and R. B. Shelley. Other motors are discussed in the appended bibliography of that paper.

In U.S. Pat. No. 3,508,091 to R. J. Kavanaugh a single pair of toroidal stator sections is associated with a single rotor disc carrying an offset external ferrite sleeve having circumferentially spaced, alternately poled segmental areas, to provide unidirectional step advance or slewing motor rotation.

In U.S. Pat. No. 3,522,501 to A. Nyman a single pair of axially spaced opposed stator sections with radial field between spaced concentric pointed stator poles is associated with a single disc rotor carrying iron rotor pole bodies, to drive a non-reversing paper feed sprocket.

A true stepping motor, with which the present invention is concerned, is a motor capable of effecting stepwise shaft rotation through any number of discrete angular steps from zero rate (i.e., holding) ranging up to a peak stepping rate, and of reversing the sense of rotation of the rotor for any following angular step. Such operation requires a minimum of three phases, i.e. three active stator sections and associated rotor pole groups. The present invention will be particularly described with reference to motors having four stator sections arranged as axially-spaced pairs, each pair coacting with a single rotor element, wherein the arrangement provides either three active phases associated with one zero-power holding section where long-period holding by a conventional power pulse would be impractical, or, the motor may comprise four active phases. The invention however extends to any feasible number of paired axiallyspaced sections.

It is known to provide excitation of stator sections in various modes, ranging from the application of a pulse to one coil of the stator windings at a time while the other phases remain unenergized, to complex excitation patterns generally characterized in that while the largest current pulse is delivered to only one stator winding, lesser magnitude currents are simultaneously delivered to certain other sections depending on the relative angular position of such sections with respect to the peak current stator. While it is possible for a given design to improve the resolution, i.e. the precision of angular positioning of the rotor by choosing an optimum excitation mode, and to increase the torque-to-weight ratio, the peak pulse rate and the maximum torque can be improved only up to a point if the design provides inferior reluctance ratio and large rotor mechanical moment of inertia.

The present invention seeks to reduce significantly the angular moment of inertia of the rotor system. The present invention also seeks to increase the reluctance ratio of the stator/rotor magnetic circuit. To achieve these joint ends, the novel rotor construction is based on axial, rather than radial modifications of the rotor pole support elements, and the rotor poles are formed as paired sets, extending axially to opposite sides of a single mounting element for each pair. The reduction of rotor inertia is achieved according to the invention by disposing a single rotor pole mount carrying two rotor pole sets, between an axially spaced pair of stator toroidal sections, wherein each set of rotor poles cooperates with a corresponding stator pole set, and wherein the active rotor pole material of each set is confined within axially-spaced planes normal to the axis and bounding the respective stator section. Thus, an M - phase stepping motor, having M stator sections and M rotor pole sets, but only M/2 rotor pole mounts, preferably realized as discs or spoked wheels of a low-density structural material, which may be made very thin in its axial dimension.

The total weight for a given torque is further minimised by spacing the axially separated sections of a stator pair as closely as the axial thickness of the rotor pole mount will permit for free rotation, thus minimising the axial lengths of rotor poles, and the total axial length of the motor housing.

Improved reluctance ratio of the stator/rotor magnetic path for the axially extending rotor pole forms of the invention is realized when the rotor poles have cross-sectional areas, measured in a plane transverse to the stator pole flux, which are less than the areas of the associated stator pole surfaces, and when the stator pole arrangement and rotor pole form are such that in the low-reluctance position the air gap dimension traversed by the leakage flux is a large fraction of the inter-pole gap dimension of the stator poles.

In carrying the invention into effect in a first expression of the inventive concepts outlined, the rotor mount comprises a disc of a light metal or alloy to which are secured a pair of rotor pole groups comprised as an axially elongated circumferentially spaced array of rectangular segments of a cylindrical shell, closely girdling the sets of like segmental pole portions of a pair of associated stator sections, and supported by the disc centered in the rotor cylinder, the respective poles being cantilever beams having radial thickness a half or less of the thickness of the stator poles, and circumferential length less than the circumferential dimension of a stator pole segment. The iron bodies forming the rotor poles preferably constitute only that portion of each segment actively associated with the stator flux.

In an alternative expression of the inventive principles, the rotor mount comprises a low inertia disc of light metal or alloy, set between a pair of closely adjacent stator sections each having one wall annularly slotted and sectoral portions of the slot enlarged to form radial poles with the inner and outer pole groups angularly offset with respect to each other, and the associated rotor pole group is formed as an axially short iron sleeve of crenulate form, i.e. radially corrugated to provide a peripherally spaced series of arcuate pole surfaces alternately facing outwardly and inwardly, the pole surfaces being arcuate sectors connected by bridges set at an acute angle to the radius, preferably nearly at right angles to the leakage flux for the high-reluctance rotor position. The rotor ring constituting one rotor pole set is entirely located within the annular slot of the stator section, and hence has minimal mass. The radial thickness of the arcuate pole surface portion is less than half the radial distance across the annular slot.

Rotors such as described hereinabove have been found to exhibit low angular moment of inertia for a given torque, and because a significantly greater fraction of the total rotor mass is constituted by active pole iron, a stepping motor constructed according to the invention having a given number of phases is capable of driving a load of higher inertia than has heretofore been possible; conversely, such motor is capable of achieving higher pulse rates for a given load than a conventional prior art stepping motor of like dimensions and number of phases.

A stepping motor construction according to the invention, having $n$ poles per active section, provides the possibility of utilizing one set of axially extending rotor poles, formed with a complement of $n \cdot M$ poles, when associated with a stator section having a like number of stator poles provided with a permanent magnet and a reluctance bridge in the stator magnetic circuit, to cause a detenting torque to be exerted by flux established between stator and rotor poles to hold the rotor locked at each step position. A winding in the detenting stator section is energiseable to counter the holding torque by neutralizing the pole flux when the detenting action is not required. Such coil is simply energized by a low DC current to disable the holding, hence each pulse delivered to the active section windings need not persist longer than the step time of the rotor, and the disabling current may be provided from the same source as the step pulse.

The invention may be more fully comprehended by a reading of the description of its embodiments which next follows, in conjunction with a study of the accompanying drawing, wherein.

Referring to the drawings, FIGS. 1 through 4, a stepping motor generally designated 10 comprises a casing 11, three active stator sections numbered 12, 13, and 14 from left to right, each having ten poles, respectively comprised as left and right section halves 15, 16; 17, 18A; 18B, 19; and a fourth section 20, herein illustrated as a detenting unit, comprising left and right halves 21, 22, all sections being of toroidal form, coaxial with the housing, and of like dimensions. The stator member 18 which is common to the second and third section halves 18A, 18B is preferably formed as a one-piece iron body as by die-forming, vacuum casting, or milling.

The first and second sections 12, 13, and the third and fourth sections 14 and 20, are arranged as axially spaced pairs, disposed on either side of member 18, each pair enclosing between them a rotor disc 23 carrying two sets of rotor poles constituted by 10 rotor pole segments 24 arrayed as a cylindrical shell. The segments 24 are peripherally mounted as by welding or staking on the disc, preferably secured to annular or axial flange 25 centered on the segments 24. Each disc 23 is secured fast to the motor shaft 26, which is journalled in anti-friction bearing sets 27 secured in the end stator halves 15 and 22, for rotation about the motor axis.

Each rotor segment, and the component halves of each stator section, are made of a highly permeable low-remanence magnetic material, i.e. soft iron or grain-oriented low-hysteresis ferrous material. Where the lowest possible rotor moment of inertia is required, the intermediate portions of the segments 24 may comprise non-magnetic beam elements of light structural material carrying iron strip pole bodies, although one-piece segmental iron strips as illustrated simplify construction. Each stator section is in the form of a hollow torus when the halves are axially assembled, axial radial sections of which are incomplete rectangles. The outer cylindrical shell wall portion of each torus is slotted by the median slot 28, and the slot is axially widened at uniform angular intervals to form salient stator poles 29 uniformly spaced circumferentially, which are integral segmental portions of the torus shell, axially aligned as opposed pairs and spaced apart by the slot distance 28. Each torus includes a concentric mounting flange, as 115, 118A, 118B, and 122, extending radially beyond the rotor segments, for engagement by the housing 11.

Each torus encloses a winding bobbin 30 which carries a winding, such as 31, 32, 33 and $34^4$, numbering from left to right, of which the first three are identical and are driving coils for respective stepping motor phases embodied in sections 12, 13, and 14, and the winding $34^4$ being generally smaller in winding section and of smaller current carrying capacity, and functionning as a detentunlocking coil in section 20, as will be described hereinafter.

The slot 28 carries axially directed flux in the gap between opposed stator poles 29 when the appropriate terminals of a stepping winding are energized from a DC pulse source (not shown). The segmental rotor pole bodies 24 are arranged to move closely adjacent the outer surfaces of the stator segments and the relative angular positions of the active stator segments may be understood from FIGS. 2A, 2B and 2C. The rotor pole segments 24 preferably have a circumferential dimension appreciably less than the arcuate distance between consecutive stator poles 29, to minimize leakage flux in the high reluctance rotor position. The radial thickness of a rotor pole segment is preferably less than half of the radial thickness of the stator pole segment to minimize mass and to augment attractive force, but the segment as mounted on disc 23 should have sufficient beam strength to resist bending or deformation when subjected to large attractive forces. These forces have tangential and radial components, the radial component predominating while the coil is energized as the rotor segment moves into overlying relation with a stator pole.

The stator member 18 which is common to the second and third sections may advantageously be shaped to provide a radial mounting flange 35 serving to secure left and right halves of housing 11 as by bolt fasteners 36. The outer ends of the housing halves are similarly secured to the outermost stator sections 15 and 22.

The rotor poles 124 of the set associated with the stator section pair 21 and 22 are modified to provide 30 segmental pole bodies extending axially to the right of rotor disc 23 in equiangularly spaced relation to segmental stator poles 129 of detenting section 20, whereas only ten segmental pole bodies 24 extend axially to the left, encircling stator poles 29 of the active section 14. The thirty opposed stator poles 129 of the detenting half-sections 21, 22 and the thirty rotor pole set 124, are disposed in such angular relation with respect to the active stator pole pairs 29 of sections 12, 13 and 14, and to the other rotor segments 24, that the detenting segments 129 are in low reluctance magnetic circuit relation with the detenting rotor poles whenever one rotor segment 24 of an active section is in the low reluctance position, as may be understood from the right-hand portion of FIGS. 2A, 2B and 2C. It is pointed out that both in the motor illustrations and in the developed pole plan views, the axial separations of adjacent stator sections, and the lengths of rotor segments, have been exaggerated for clarity of representation and numbering.

For convenience and economies of fabrication, the active sections 13 and 14, which include the half-sections 18A, 18B of central member 18, have their stator poles 29 axially aligned, whereas the poles 29 of the first section 12 are advanced by one-third pole pitch, for example, from poles 29 of section 13, in the lead direction, i.e. opposite to the direction of rotor motion indicated by the arrow.

The rotor segments 24 common to the pole sets of the first and second sections 12 and 13 are axially aligned so that only one pole set, i.e. segment portions extending to one side of the disc, are subjected to peak torque at a given step. The active rotor segments 24 of the third section 14 are also angularly advanced with respect to the rotor segments 24 of sections 12 and 13 by one-third pole pitch in the lead direction opposite to the direction of rotor rotation. The relative positions are as tabulated below:

TABLE I

Relations of stator and rotor poles for motor of three active phases

| Phase A | Phase B | Phase C |
|---|---|---|
| Stator poles lead B and C by P/3 | Stator poles axially aligned | |
| Rotor poles axially aligned | | rotor poles lead B and C by P/3 |

Figures 4, 5, 6, 7:
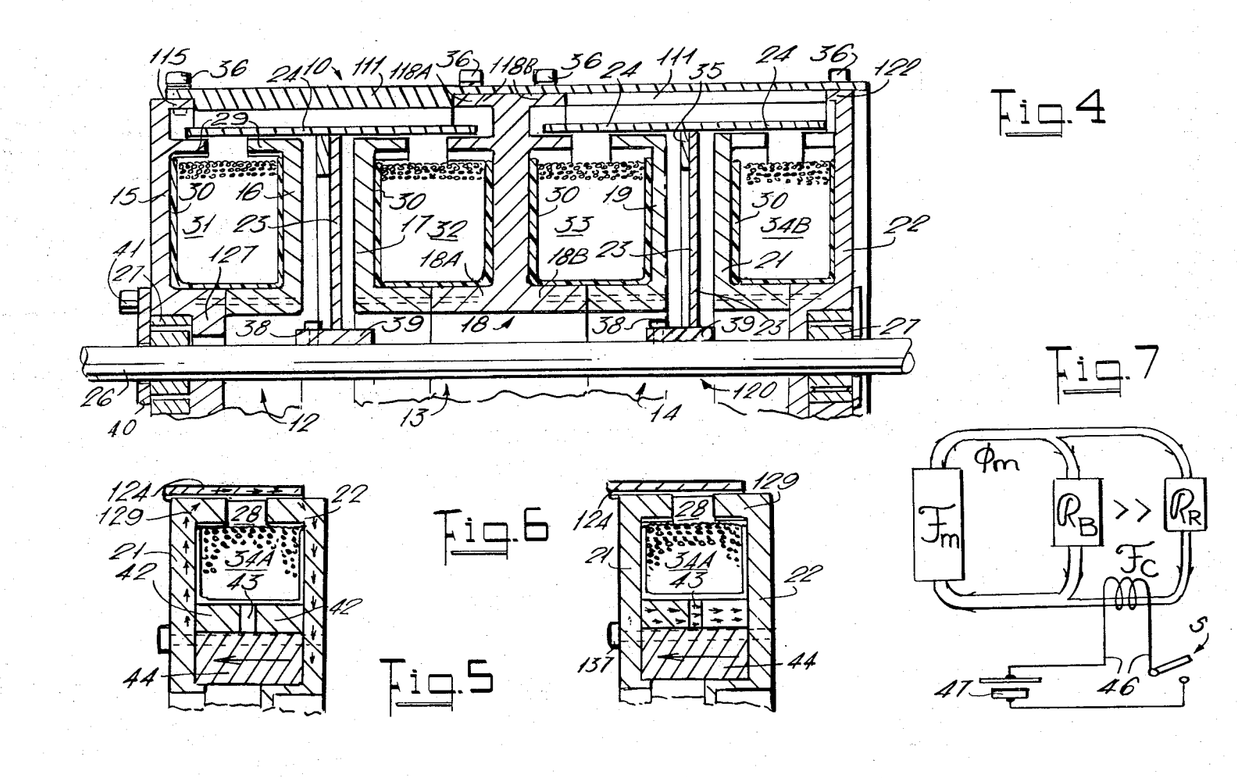
FIG. 4 is an elevation view of an assembled motor similar to FIG. 1 assembled with the components of FIG. 3.
FIGS. 5 and 6 are detail sections of the detenting section of the motor of FIG. 1 showing flux relationships respectively with no coil current and with a flux-cancelling coil current.
FIG. 7 is a schematic MMF and reluctance diagram for analysing the conditions in the magnetic circuit of FIGS. 5 and 6.

The relative arrangements for any greater number of active sections may be readily established, for example where section 20 is also made an active section to provide a four-phase stepping motor without detenting provisions, as in FIG. 4, the pole relationships will be as in Table II.

TABLE II

Relations of stator and rotor poles stepping motor of four active phases

| Phase A | Phase B | Phase C | Phase D |
|---|---|---|---|
| Stator poles lead B, C by P/4 | Stator poles axially aligned | | Stator poles Lead B, C by P/4 |
| Rotor poles axially aligned and leading C, D by P/2 | | Rotor poles axially aligned | |

The foregoing arrangement is preferred because of economies in fabrication, as the rotor structure is simple. Nevertheless, motors according to the invention may have rotor pole sets carried by a disc in any desired angular relation instead of the axially aligned, common segmental form.

Figure 1:
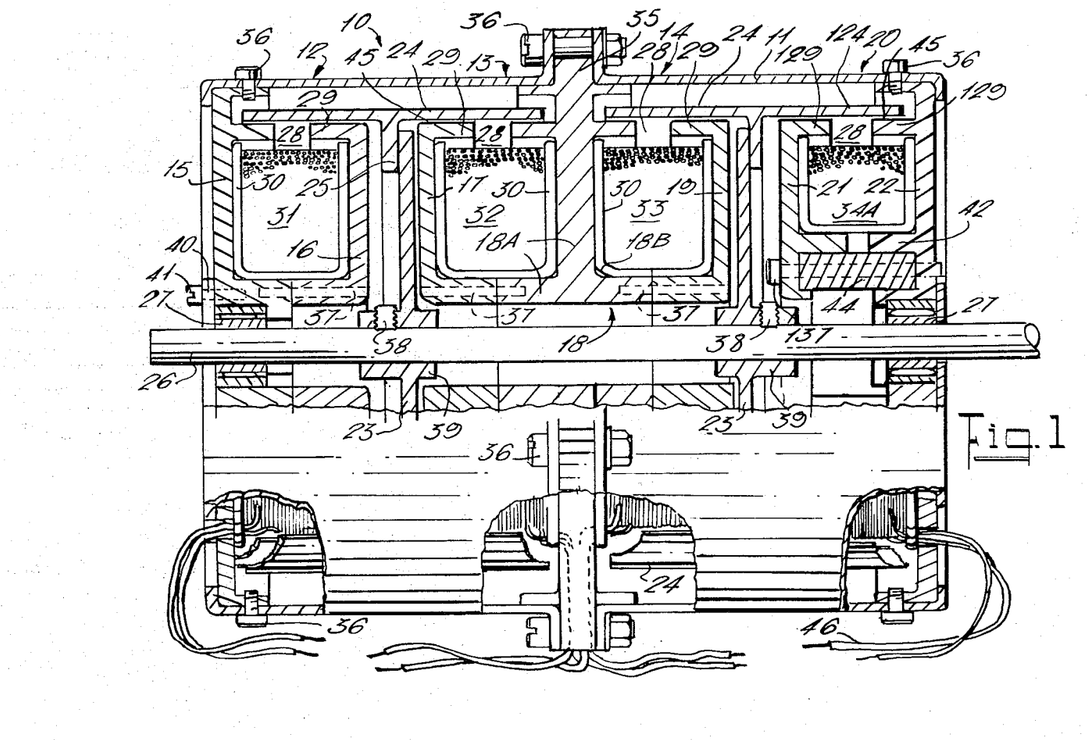
FIG. 1 is an elevation view of an assembled motor according to the invention, partly in diametral/axial section.
Figures 2A, 2B:
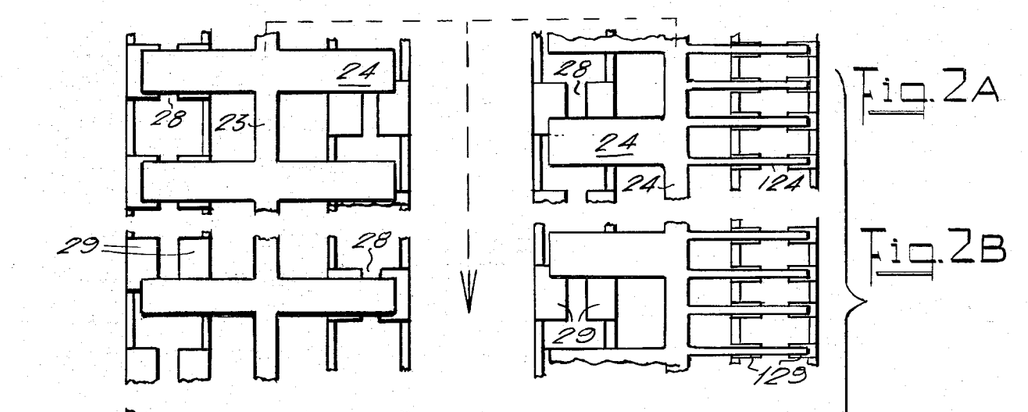
FIG. 2A, 2B and 2C shows developed plan views of rotor and stator pole relationships for a sequence of excitations and rotor steps.
Figure 2C:
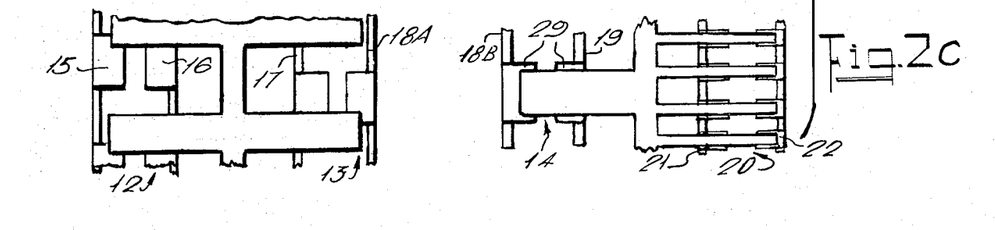

In assembling the motor of FIG. 1, the section halves 17 and 19 including bobbins 30 and windings of the second and third stator sections 13, 14 are assembled in the axial direction outwardly from central stator member 18, respectively being secured in mating relation with elements 18A and 18B by pins or rivets 37. The shaft 26 is passed coaxially through; assembled rotor segments 24 on discs 23 are next passed axially along from opposite ends of the shaft, and are secured in the desired orientations as by screws 38 in hubs 39. The assembled first and fourth section halves 15, 16 and 20, 21 are next brought axially inwardly over the shaft, and the housing 11 is assembled axially toward central member 18. Bearings 27 are fitted axially into seats 127 in outer halves 15, 22, and seal discs 40 and retaining screws 41 fitted to secure the bearings in place.

Figure 3A:
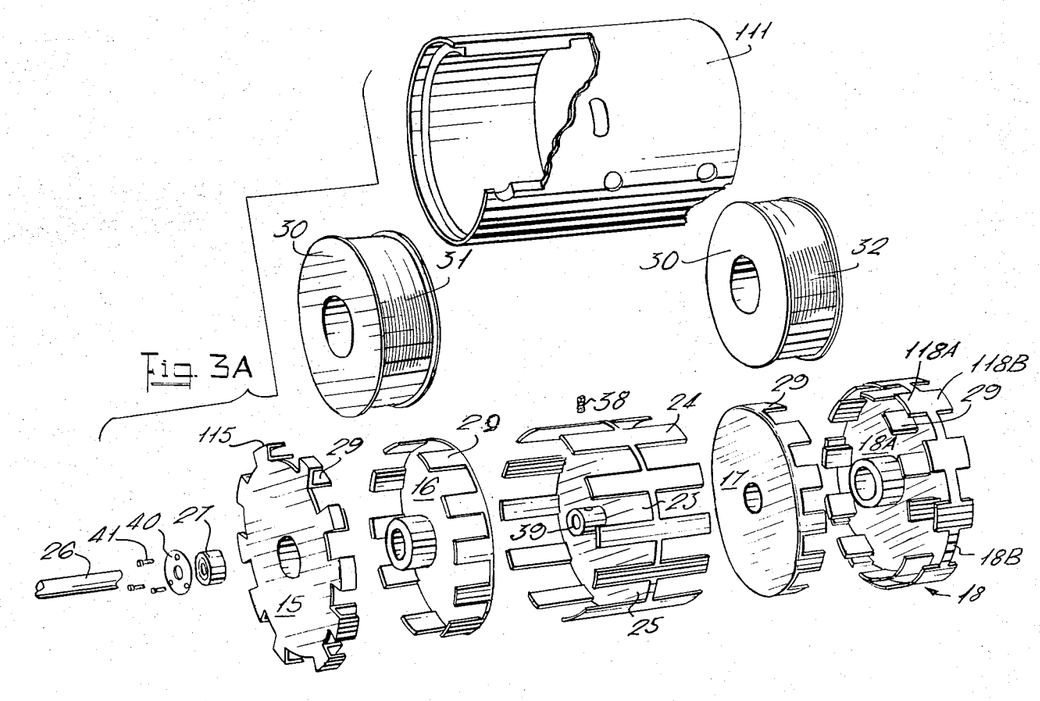
FIG. 3A and 3B comprises axially-extended, separated assembly views of the components of the motor of FIG. 1, removed from the telescoping housing.
Figure 3B:
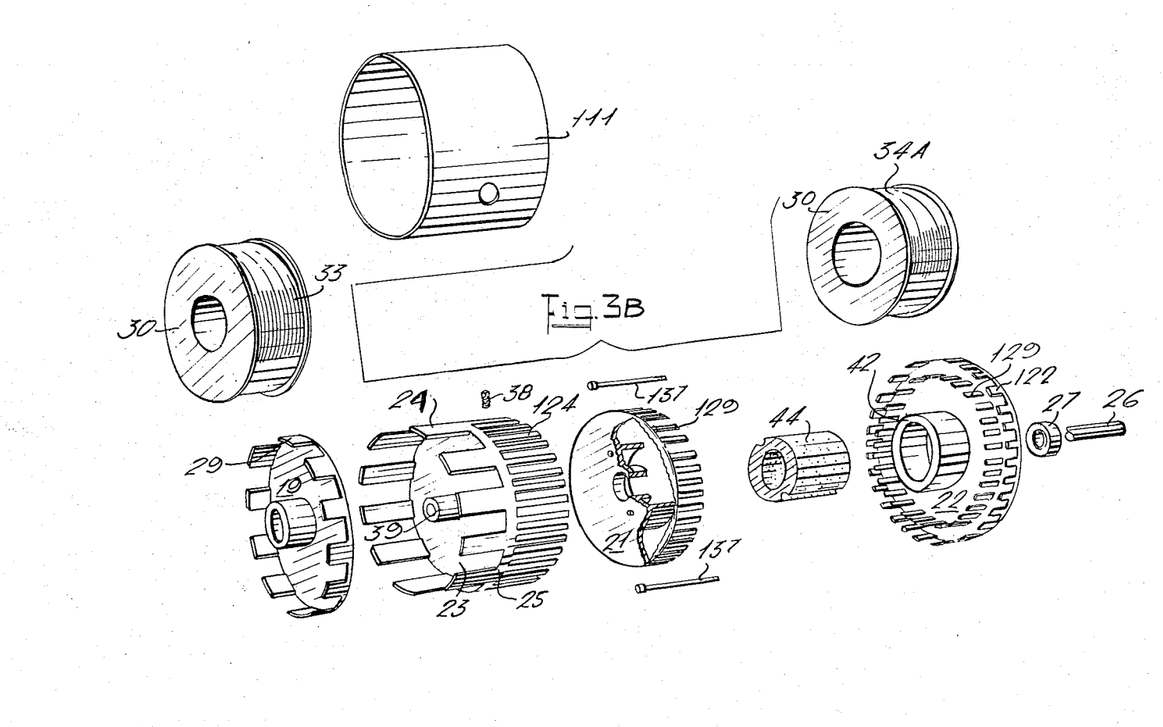

Referring also to FIGS. 3A and 3B, an alternative telescoping housing 111 may be provided where a radial flange projecting from central member 18 is not required for mounting purposes.

FIG. 4 illustrates a motor similar to that of FIG. 1 having no detenting section, comprising four active stator sections 12, 13, 14, and 20 arranged as two stator pairs cooperating with two rotor disc/shell assemblies. A telescoping shell 111 is also provided, of the type depicted in FIGS. 3A and 3B, closely engaging axial flange portions 115, 118A–118B, and 122 projecting from the section halves 15, 18 and 22 respectively and pinned therewith in the desired angular dispositions. No projecting radial flange extends from central member 18. The end members 15 and 22 are made identical as are the half-sections 16, 17 and 19, 21. All windings 31, 32, 33 and 34B are stepping windings. Motors constructed and assembled in accordance with the foregoing arrangements may be axially extended to any practical number of stator sections, for example, six, eight, 10, 12 or more. Depending on the excitation mode, higher torque outputs are obtainable with increased numbers of phases.

Referring next to FIGS. 5, 6 and 7, in conjunction with FIG. 1, a detenting unit for the foregoing motors comprises a toroidal stator section 20 having a stator pole slot 28 in the outer shell wall, axial flanges 42 integral with each section half axially aligned and spaced by an axial gap 43 and located between the inner and outer torus shell walls, the torus section in radial axial planes being an incomplete rectangle in that most or all of the inner shell wall is absent. A permanent ring magnet body 44 is fitted contiguous with the flanges 42 and extending between the lower margins of the sides of the torus shell formed by half-sections 21, 22, the magnet being poled in the axial direction and tending to set up a holding flux around the torus section and traversing the pole slot 28 as may be seen from the short arrow train indicated by FIG. 5.

When a rotor segmental pole body 124 overlies the stator pole segments 129, the low reluctance of the path through the residual air gaps 45 and the iron is considerably less than the reluctance of the shunt path through the flanges 42 and gap 43, hence a strong holding flux locks the rotor in this relative position with the stator. If an attempt were made to operate the motor in this state, little or no net torque would be available initially for stepping the rotor after overcoming the holding torque, which is maximum when the rotor segments are registered on the stator segments. To disable the holding, a small direct current is led to terminals 46 of detentunlocking coil 34A, to develop a counter MMF of such sense as to oppose the MMF across the poles 129 of the section 20. When the ampere-turn product of the coil is correctly adjusted, the net MMF across the pole slot 28 is zero, and the MMF across the shunt gap 43 between flanges 42 adds to the MMF due to the magnet, tending to set up a flux in that gap. Demagnetization of the magnet is thus avoided. When the coil current is interrupted, the poles 129 promptly attract and hold the nearest rotor segments 124.

The system may be analysed with the aid of FIG. 7, wherein a battery 47 is shown connected in circuit with switch S and coil 34A generating the MMF $_c$. poled in the anticlockwise sense in the magnetic loop indicated by the parallel dashed line path through $R_B$ (the reluctance of shunt gap 43) and $R_R$ (the reluctance of residual gaps 45 in series, paralleled by the reluctance of pole slot 28). The magnet body 44 representing the MMF source $_M$ normally sets up a flux in the magnetic circuit, of strength $\phi_M$. The shunt gap 43 will generally present a considerably larger reluctance than the low-reluctance due to residual gaps 45, hence while switch S is closed and if the coil current is appropriate, there is negligible flux in the residual air gap; the detenting unit accordingly offers nil opposition to movement of the rotor, other than its contribution to the inertia.

Referring next to FIGS. 8, 9, 10 and 11, an electrical stepping motor generally designated 100 having high torque, high pulse rate, minimal rotor moment of inertia, and minimal weight/torque ratio, comprises four stator sections 112, 113, 114 and 220 arranged as axially spaced pairs, each pair cooperating with a respective one of a pair of rotor discs 123. All of the motor sections are active sections, although the detenting unit of FIGS. 12 and 13 to be described hereinafter may be incorporated whenever zero-power holding is required. The motor comprises end discs 49, a central disc 50, a sleeve housing 51 and four identical paired outer and inner stator pole-forming elements 52 and 53 respectively. The inner elements 53 are each joined as by fasteners 54 to the disc stator element associated with the section, while the outer stator elements 52 are pinned to the housing 51 as by pins or screws 55. The sections are held in position along the common axis by means of non-magnetic spacing rings 56 such as polycarbonate or nylon bodies, end pressure being applied to the column by screw ring 57 engaging internal threading 58 at one end of sleeve 51, and the compression load being resisted by sleeve end flange 59 engaging end disc 49. The central section elements 53 are clampedly secured to central disc 50 by a flanged threaded sleeve 60 and nut 61 engaging the radial inward flanges 62.

The outer pole-forming elements 52 comprise ring bodies having an inward radial flange 63 which is formed to present spaced radial stator pole faces 64 and the elements 53 have corresponding outward radial flanges 65 formed to present stator pole faces 66 spaced by an annular gap 67 from each other in the radial direction. Preferably, the respective flanges 63 and 65 form a straight-sided annulus, and the pair of flanges are closely axially spaced from the flanges of an opposed companion pair of the adjacent stator section, a distance just sufficient to permit free rotation of the rotor pole mounting disc 123 between them.

The space within the elements 52 and 53 enclosed by a stator disc wall is occupied by a stepping winding such as 31, 32, 33 and 34B as in the motors previously described, the leads being taken out through suitable apertures in the stator structure and/or housing.

Figure 9:
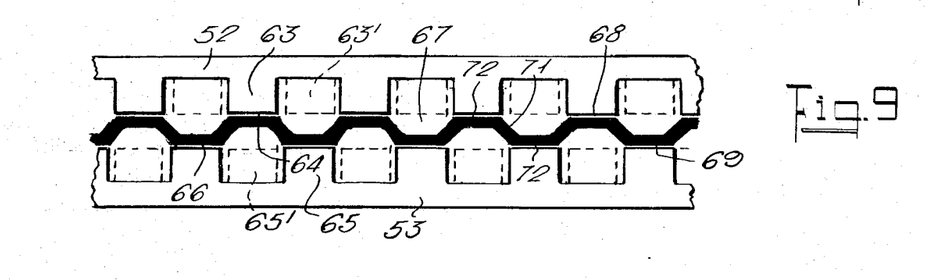
FIG. 9 is a developed plan view of the relative stator pole/rotor pole positions for the motor of FIG. 8.
Figure 10:
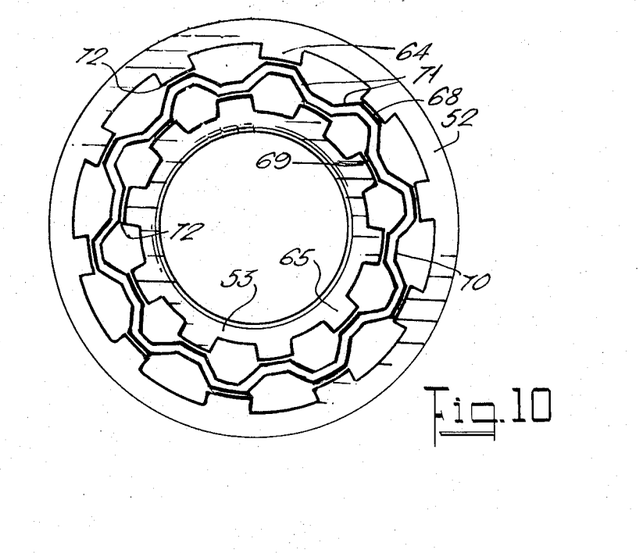
FIG. 10 is an elevation view looking into a stator section of the motor of FIG. 9, showing the rotor ring in low reluctance position.
Figure 11:
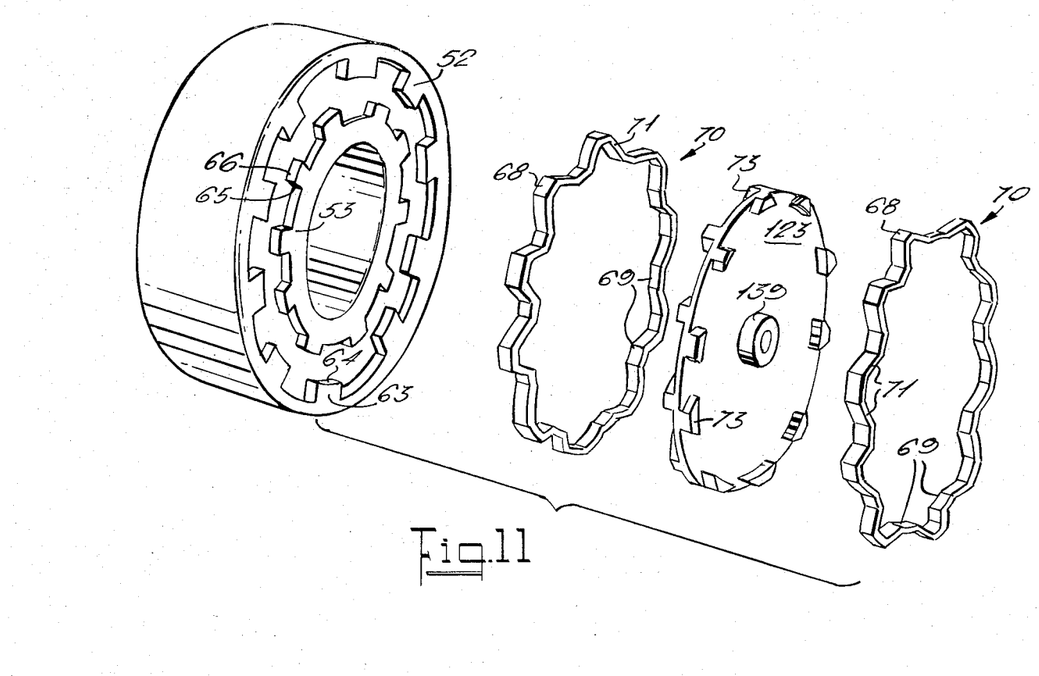
FIG. 11 is an axially extended, disassembled view of the rotor mount, rotor rings, and one stator section of the motor of FIG. 8.

The rotor reluctance states may be understood from FIGS. 9 and 10, and the structure from the perspective dis-assembled views in FIG. 11. In FIG. 9 the sets of stator pole flanges 63 and 65, and pole faces 64 and 66, are shown in developed axial projection as linearly extended parallel arrays separated by the slot 67. The outer pole set is staggered with respect to the inner pole set. The rotor pole faces 68, 69 are integral inner and outer arcuate portions of ring iron bodies generally designated 70, of crenulate form, having a radial thickness a half or less of the slot dimension. The stator pole faces have a circumferential length somewhat less than half the pole pitch distance, while the rotor pole surfaces have circumferential lengths just slightly smaller than the stator pole length. The relative positions of the stator and rotor poles are shown in solid lines for the low reluctance position while the phantom stator set shown in dashed outline, bearing primed reference numbers, represents the relationship for highest reluctance. The flux path may be traced from a stator pole such as 64, dividing in a rotor pole face 68, the path following along the connected bridging members 71 after passing through the residual air gap 72, and including part of arcuate rotor pole faces 69 and inner residual gaps 72. When the air gaps are made small, for example of the order of 0,004 inch, very low reluctance conditions are established. In the high reluctance position it will be evident that the stator pole leakage flux is impeded by long air paths, as no part of the rotor bridge members 71 provides an important diminution of the reluctance, since the bridges are disposed substantially at right angles to the leakage flux path.

Referring to FIGS. 10 and 11, the rotor pole mount comprises disc 123 which may be of a structural material adequate for the torque developed, for example a plastic, a light metal, or light metal alloy. One form of support for a pair of rotor rings constituting a pair of rotor pole sets, herein illustrated with P/4 pole-pitch angular offset, comprises a d sc having peripherally spaced, laterally projecting truncated integral wedge-like support elements 72. The support elements are axially received under the outward rotor pole faces 68 and the ring is affixed thereon as by suitable cementing or brazing operations. The rotor rings 70 have axial dimensions comparable to the axial thickness of the flanges 63 and 65. Where the shortest motor length is desired, any excess length of rings 70 is preferably arranged to extend within the stator section with no part projecting beyond the plane bounding the section.

The rotor rings may have their pole sets axially aligned, i.e. the supports 73 may project directly oppositely from the margin of disc 123, and the stator sections would accordingly be disposed in suitable angular correlations thereto. Whereas two separate rings are illustrated and preferred as rotor pole sets offering minimal angular moment of inertia, a single rotor pole ring (not shown) having sufficient axial length to extend fully into opposed stator pole slots 67 may be employed, with correspondingly increased angular moment of inertia. The wedge-like supports 73 of such rotor form are axially aligned, and the disc periphery is crenulated to the internal cross-section of the ring, permitting the inner pole faces 69 to seat on recessed disc portions.

Figure 8:
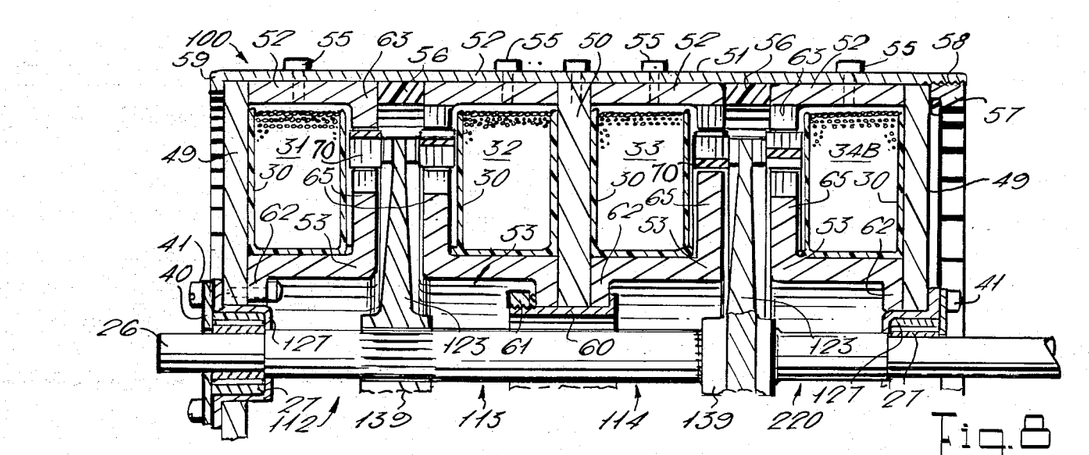
FIG. 8 is an elevation view of an alternative stepping motor in axial diametral section, employing crenulated rotor ring pole sets.
Figures 12, 13:
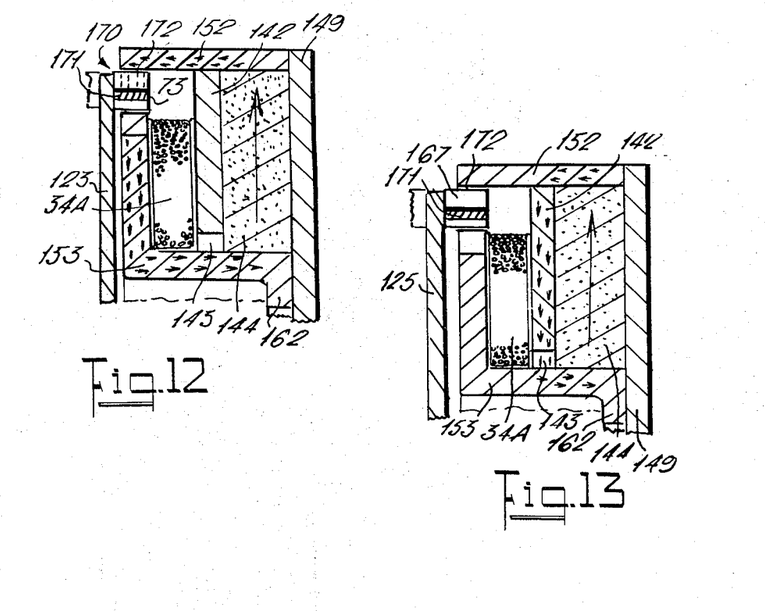
FIGS. 12 and 13 are detail sections of the detenting elements of the motor type of FIG. 8 for holding and release states.

Referring also to FIGS. 12 and 13, a detenting unit for use with the motor of FIG. 8 employs an aluminum or other nonmagnetic structural material end disc 149 and stator pole-forming section elements 152 and 153, which are similar to elements 52 and 53 already described, except that the stator pole complement is $n.M$ as for the detenting system previously described and the rotor ring 170 extending axially into the stator slot 167 is also similar to a ring 70 except that it is formed to provide $n.M$ rotor pole faces 168 and 169 to cooperate with the detenting stator poles.

A magnet 144 of thick annulus form, radially poled, is disposed adjacent the inner surface of end disc 149 and engages the stator pole-forming elements to set up a holding flux as diagrammed in FIG. 12, passing through the residual gaps 172, the rotor pole faces of registered rotor poles, and bridging members 171.

A shunt flange 142 of annular form engages the inner surface of outer pole-forming element 152, contiguous with the inner side face of magnet body 144, occupying, together with the magnet, a substantial portion of the space otherwise available for a stepping winding. The detent-unlocking coil 34A is disposed between the shunt flange 142 and the torus wall adjacent rotor disc 123. A high reluctance shunt gap 143 is traversed by relatively minor flux when the rotor is in detented position. When the coil is energized by a DC current to set up an appropriate ampere-turn product, the flux distribution is as shown in FIG. 13. The MMF of the winding adds to the MMF of the magnet in the shunt flange to pass a flux through the gap 143, but wholly cancels the MMF across stator pole slot 167, to release the rotor.

I claim:

1. An electrical stepping motor having stator sections coaxial of and spaced along an axis, each section having the form of a hollow torus shell, an annular disc wall of the torus having an annular coaxial slot opening and the slot being widened radially at intervals to define sectoral elements comprising sets of stator poles, one set of stator poles extending radially inwardly and a set extending radially outwardly, each set terminating at said slot opening and having arcuate pole faces, the sets of pole faces being in angularly staggered relation, an electrical winding in each torus energizeable to magnetize said stator poles, a rotor shaft rotatable about said axis, support elements mounted on said shaft, and rotor poles carried by said support elements comprising a crenulate ferromagnetic rotor ring disposed concentrically in said slot opening corrugated in the radial direction and comprising arcuate segments forming sets of rotor poles having alternately inward-facing and outward-facing cylindrical pole surfaces, consecutive segmental portions of said ring being connected by oblique bridging members.

2. The motor of claim 1 wherein one of the stator sections is a detenting section and wherein a side wall of the torus remote from said slot comprises a nonmagnetic annulus, said torus comprising a thick annular ring permanent magnet disposed adjacent said nonmagnetic annulus and fitted contiguously within the outer and inner cylindrical walls of the torus and providing a holding flux in said slot between registered stator and rotor detenting poles, a magnetic shunt annulus spaced adjacent said magnet on the side of the slot opening and having a radial reluctance gap, the number of stator poles and rotor poles of the detenting section each being $$n.(M-1)$$

where n is the number of poles of an active stator section and where (M−1) is the number of active stator sections of a motor having a total of M stator sections, said torus having a winding disposed between said shunt annulus and said slot opening energizeable to cancel the holding flux developed by said permanent magnet across said slot opening to release the rotor.

3. The motor of claim 1 wherein the axial length of the rotor ring is approximately equal to the axial length of a stator pole face and wherein each rotor pole face has a circumferential length slightly less than the circumferential length of a stator pole face.

4. The motor of claim 3 wherein the radial thickness of the rotor ring is a half or less of the radial span of the slot opening.

5. The motor of claim 1 wherein the stator sections disposed between two consecutive axially-spaced rotor pole support discs have their contiguous torus walls comprised as a single annulus.

6. The motor of claim 5 wherein the motor has a single sleeve housing and each torus has a cylindrical outer wall engaging said sleeve, said sleeve being secured in fixed angular relation thereto and to said single annulus.

7. The motor of claim 1 wherein the rotor rings are carried on laterally projecting supports integral with the disc periphery received under the inner faces of the outwardly facing rotor segments.

8. The motor claimed in claim 7 wherein each rotor disc has its periphery crenulated and carries a single rotor ring having an axial length sufficient to span the stator pole faces of two adjacent opposed stator sections.

* * * * *